United States Patent

Harrison

[15] 3,641,700
[45] Feb. 15, 1972

[54] SINKER RELEASE FOR FISHING TACKLE

[72] Inventor: John R. G. Harrison, c/o Robert Frayne & Co., Rm. 212, 1200 West Pender St., Vancouver 1, British Columbia, Canada

[22] Filed: Sept. 22, 1969

[21] Appl. No.: 859,756

[30] Foreign Application Priority Data

Oct. 30, 1968 Canada...................033889

[52] U.S. Cl............................................43/43.12, 43/44.88
[51] Int. Cl. ......................................................A01k 95/00
[58] Field of Search.................................43/43.12, 44.88

[56] References Cited

UNITED STATES PATENTS

| | | | |
|---|---|---|---|
| 2,379,676 | 7/1945 | Blackstone | 43/44.88 |
| 2,844,906 | 7/1958 | Phillips | 43/43.12 |
| 2,994,622 | 8/1961 | Miller | 43/43.12 X |
| 3,426,469 | 2/1969 | Lee et al. | 43/43.12 |

*Primary Examiner*—Samuel Koren
*Assistant Examiner*—Daniel J. Leach
*Attorney*—Roy E. Mattern, Jr.

[57] ABSTRACT

A sinker release assembly mounted on a fishing line with means to frictionally engage the line and hold the assembly in a fixed position on the line, which means is releasable to permit the parts of the assembly to slide on the line. The assembly comprises a body member having a longitudinal passage therethrough with two spaced wing elements having aligned holes to receive a plug of a size closely fitting in the holes and which has a transverse aperture adjacent one end. The fishing line is passed through the body passage and plug aperture and the plug is then inserted into the aligned holes to wedge the line therein and hold the assembly on the line. A pull by a fish will withdraw the plug from the holes and free the body and plug to slide on the line.

3 Claims, 4 Drawing Figures

SINKER RELEASE FOR FISHING TACKLE

The invention consists of a longitudinal body slidably carried on a fishing line having two wings which are substantially parallel on one side of the body, the wings have holes in alignment. A plug, also slidably carried on the fishing line, may be inserted into the holes in the wings and retain a sinker between the wings.

The U.S. Pat. Nos. 2,322,536, 2,562,054 and 2,825,993 by Miller, Mathieu, and Harrison, respectively, provide sinker-release apparatuses. The spring release in each one of those patents teaches an apparatus in which the spring is usually made from a metal that will corrode in saline solutions.

The principle object of the device in the instant application is that it is economical to manufacture. A further object is the simplicity of its design. Another object is that the materials, herein signified as the most appropriate, will not corrode since there are no metallic springs that constitute the best design for this invention.

Other objects, features, and advantages of the invention will be apparent from the following description when read with reference to the accompanying drawings. In the drawings, wherein like reference numerals denote corresponding parts throughout the several views.

Figure 2:
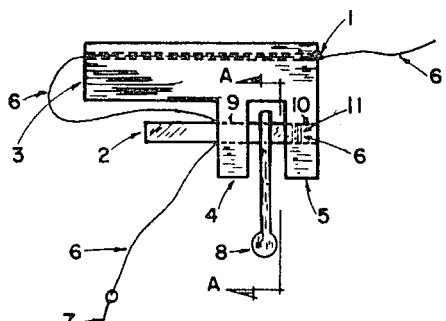
FIG. 2 shows an elevation view of the device when in use.
Figure 3:
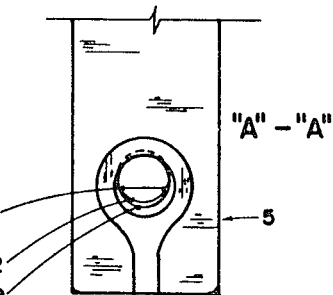

FIG. 3 displays a side view of a sinker held in place as in FIG. 2, view A—A, and is an enlarged view.

Figure 4:
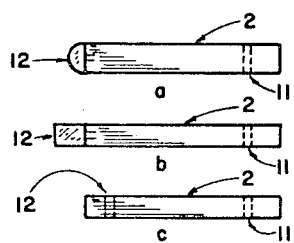

FIG. 4 shows the various construction means by which the insertion plug is weighted at its end.

Figure 1:
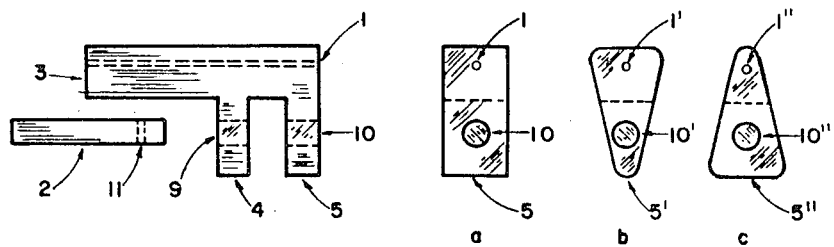
FIG. 1 shows an elevation and various other profile views of the elongated body or receptacle and the insertion plug thereinto applied to the respective receptacle.

Referring now in detail to the drawings, FIG. 1 displays coupling 3 which has two spaced wings 4 and 5 depending therefrom. Wings 4 and 5 have aligned holes 9 and 10, respectively. Part (a) of FIG. 1 shows a profile view of one particular configuration for coupling 3 whereas parts (b) and (c) of FIG. 1 display other variations in the form of coupling 3. Insertion plug 2 is shown in FIG. 1 having hole 11 therethrough adjacent the forward end of the plug. Coupling 3 has hole 1 through the longer portion of its body. It is seen that the longitudinal body or coupling 3 may be constructed in various forms; the optimum form should have rounded edges to prevent it from being caught on various unseen, underwater obstructions.

In FIG. 2, weight 8 is shown in its restricted position between wings 4 and 5. The line 6 is passed through hole 1 and runs through hole 11 in insertion plug 2 prior to the plug being placed into holes 9 and 10. When insertion plug 2 is placed into holes 9 and 10 coupling 3 is thereby held in position on the fishing line. This also holds weight 8 in place during the fishing operation.

FIG. 3 is an enlarged view which shows weight 8 being held in position by means of insertion plug 2 and fishing line 6 carried through holes 9 and 10 because of its passage through hole 11 in plug 2. FIG. 4 represents the various sizes and shapes of insertion plug 2. FIG. 4a represents insertion plug 2 which has a lead weight 12 on the end thereof. FIG. 4b represents also a lead weight 12 which has a congruent form with the rest of insertion plug 2. FIG. 4c represents insertion plug 2 also, and shows a smaller linear hole for receiving a small lead weight 12.

Having discussed the various parts of the sinker release device, the operation of the device will now be explained. In FIG. 2, the insertion plug 2 is shown in place. The insertion of plug 2 in holes 9 and 10 situates coupling 3 and the rest of the device is in a position that is predetermined; that position is held until hook 7 comes in contact with the fish or other marine life that exerts a force on fishing line 6. When a force is exerted upon hook 7, the force may be such that insertion plug 2 is released by that force from holes 9 and 10, respectively, thereby releasing weight 8 and allowing insertion plug 2 to be carried freely on line 6. The line taken up by the insertion or confinement of insertion plug 2 would provide sufficient fishing line to give a fish that has been caught by hook 7 sufficient running line in a body of water so that the fish that is caught on hook 7 would be free to move in any direction and thus provide for a minimum of breaking of the line 6.

The device as shown in FIG. 2 is explained in the following manner. Fishing line 6 is inserted into hole 1, then into hole 11 of insertion plug 2 from where it extends into the body of water and is attached to hook 7 or any other particular device that is used for catching or luring fish or other marine objects. Hole 1 may be in any particular direction and is not confined to the top of coupling 3, but must be above wings 4 and 5 when coupling 3 is placed in a vertical direction as shown in FIG. 2. The fishing line 6 should have sufficient room to be inserted into hole 1 and thereby cause no restraint in the carriage of coupling 3 on line 6; in other words, coupling 3 is free to run on line 6. Insertion plug 2 may or may not have lead weights on its nonpenetrable ends. Insertion plug 2 should be slightly tapered so as to fit into holes 9 and 10, respectively. Hole 9 may be slightly larger than hole 10 if plug 2 is not tapered. Hole 11 may be toward the penetrating end of insertion plug 2 or near the central part of said insertion plug 2; but in any case, hole 11 must be limited to the distance away from its insertion end so that it will penetrate into hole 9, at least. Insertion plug 2 and holes 9 and 10, respectively, may be square, annular, or circular, or any form therebetween. It has been found that circular or near-circular plugs provide the best resistance to withdrawal of insertion plug 2. Weight 8 is placed on insertion plug 2 when it is inserted into holes 9 and 10, respectively. Insertion plug 2 may be inserted into holes 9 and 10 at a predetermined pressure and thereby provide for the same pressure to be applied to line 6 to withdraw said plug 2 from holes 9 and 10, respectively.

The sinker release device herein described may be used as an ordinary sinker device as well as a sinker-release mechanism. This may be accomplished by not placing any sinker weight 8 in its designated position. The small weight 12 may provide the necessary weight to keep the fishing line at a deeper water level.

Other than the fishing line, the materials to be used are preferably of plastic and specifically of polyethylene. The plastic material may be of ordinary quality and may be moulded or shaped by ordinary common methods known and used in the industry.

The specific description given above of the various embodiments of the invention should not be taken as being restrictive of the invention since it is apparent that many modifications in design may be used without departing from the scope of the following claims.

I claim:

1. A releasable and partially expendable sinker assembly for slidable and frictional placement along a fishing line, comprising: end, a. a longitudinal body having a fishing line receiving passageway throughout its entire length near its top, and having two spaced and aligned depending wings at its forward dend, both wings having holes of like diameter and in alignment with their center axis parallel to the center axis of the fishing line receiving passageway; and b. a longitudinal plug having a diameter corresponding to the diameter of the wing holes and having a transverse hole adjacent its forward end to receive a fishing line therethrough, the said plug being insertable from the rear of the sinker assembly into the aligned holes of the wings of the longitudinal body and held in place by a frictional gripping force, a fishing line threaded through the receiving passageway of the longitudinal body of the sinker assembly and the forward transverse hole of the longitudinal plug with the fishing line therethrough being inserted through one wing hole, a portion of an expendable sinker, and the other wing hole, the steady pull of a fish on a hook at the end of the fishing line causing the rearward withdrawal of the longitudinal plug with the resulting loss of the expendable sinker and unrestricted travel of the longitudinal body rearwardly on the fishing line to the location of the hooked fish.

2. A releasable and partially expendable sinker assembly as claimed in claim 1, wherein the expendable sinker has a top portion to slidably encompass the longitudinal plug for a distance less that the spacing between the depending wings of the longitudinal body and a lower, heavier depending portion.

3. A releasable and partially expendable sinker assembly as claimed in claim 1 wherein the longitudinal plug is weighted at its rearward end.

* * * * *